(12) United States Patent
Fesi

(10) Patent No.: US 10,323,374 B1
(45) Date of Patent: *Jun. 18, 2019

(54) OIL SKIMMER APPARATUS AND METHOD

(71) Applicant: Michael A. Fesi, Houma, LA (US)

(72) Inventor: Michael A. Fesi, Houma, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/165,288

(22) Filed: Jan. 27, 2014

Related U.S. Application Data

(63) Continuation of application No. 13/163,196, filed on Jun. 17, 2011, now Pat. No. 8,696,242.

(60) Provisional application No. 61/355,911, filed on Jun. 17, 2010.

(51) Int. Cl.
    E02B 15/00    (2006.01)
    E02B 15/04    (2006.01)
    E02B 15/08    (2006.01)

(52) U.S. Cl.
    CPC ............ *E02B 15/046* (2013.01); *E02B 15/08* (2013.01)

(58) Field of Classification Search
    USPC ..... 405/52, 60, 63, 64; 210/242.3, 776, 923, 210/747.6, 170.05, 170.11
    See application file for complete search history.

(56) References Cited

U.S. PATENT DOCUMENTS

| | | | |
|---|---|---|---|
| 3,754,653 A | * | 8/1973 | Verdin .......................... 210/197 |
| 3,951,810 A | * | 4/1976 | Crisafulli .............. E02B 15/048 |
| | | | 210/242.3 |
| 8,696,242 B1 | * | 4/2014 | Fesi ............................... 405/60 |

OTHER PUBLICATIONS http://www.thefreedictionary.com/pontoon.*

* cited by examiner

*Primary Examiner* — Sean D Andrish
(74) *Attorney, Agent, or Firm* — Garvey, Smith & Nehrbass, Patent Attorneys, L.L.C.; Charles C. Garvey, Jr.; Seth M. Nehrbass

(57) ABSTRACT

An oil skimmer apparatus and method for removing oil from the surface of water, comprising a platform having left and right side walls, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor; and a pump connected to the rear location that removes the oil from the rear location to a storage area. The skimmer vessel can work stationary in the water, and does not require a propellor means, as the oil will continue to flow into the skimmer as the oil is pumped out of the rear by the gravity flow to the rear of the vessel.

20 Claims, 8 Drawing Sheets

OIL SKIMMER APPARATUS AND METHOD

CROSS-REFERENCE TO RELATED APPLICATIONS

This is a continuation of U.S. patent application Ser. No. 13/163,196, filed Jun. 17, 2011, which claims priority of U.S. Provisional Patent Application Ser. No. 61/355,911, filed Jun. 17, 2010, each of which is hereby incorporated herein by reference and priority of which is claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to skimming devices. More particularly, this invention relates to skimming devices for removal of oil or other pollutants from the surface water.

2. General Background of the Invention

There are skimming devices in the art, however, it is desirable that a skimming apparatus be a simple device that can work stationary in the water, and does not require a propeller or pulling means for operation, and easily adjustable so that the mouth of the skimmer sits at the interface of the oil and the water. It is also desirable that a user not need to continually adjust the skimmer elevation during use.

Examples of possibly related patents directed to such devices are listed in the following table.

The following U.S. Patents are incorporated herein by reference:

TABLE

| PAT. NO. | TITLE | ISSUE DATE MM-DD-YYYY |
| --- | --- | --- |
| 3,704,784 | Floating Oil Skimmer | 12-05-1972 |
| 3,730,346 | Skimming System | 05-01-1973 |
| 3,754,653 | Apparatus and Method for Collection of Oil from Surface of the Sea | 08-28-1973 |
| 3,822,789 | Oil Skimmer Module with Free Floating Weir Trough | 07-09-1974 |
| 3,862,904 | Boat for collecting oil slicks and other contaminants from the surface of water | 01-28-1975 |
| 3,951,810 | Oil skimmer module with free floating weir trough | 04-20-1976 |
| 4,208,287 | Oil spill skimmer | 06-17-1980 |
| 4,477,348 | Open Sea Skimmer Barge | 10-16-1984 |
| 5,043,065 | Variable draft oil/debris skimming vessel | 08-27-1991 |
| 5,216,974 | Vessel for collecting and separating oil/water in a marine environment using submerged internal collection and separation | 06-08-1993 |
| 5,478,483 | Oil spill skimmer with adjustable floating weir | 12-26-1995 |
| 5,753,108 | Integrated oil response and recovery system and method and skimmer for use therein | 05-19-1998 |
| 6,471,862 | Oil skimming apparatus | 10-29-2002 |

BRIEF SUMMARY OF THE INVENTION

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that removes the oil from the rear location to a storage area which does not affect the ballast of the platform.

Preferably, the floor is unobstructed.

Preferably, the bottom is flat.

Preferably, the level of the platform floor is variable to the consistency of the oil or pollutant on the water surface.

The apparatus can further comprise one or more propellers attached to the platform to self-propel the platform through the water.

Preferably, the apparatus further comprises a second vessel in which the oil is contained.

The apparatus can be moved by a hydraulic propeller, an outboard or a small boat.

Preferably, a vertical wall separates the ballast tanks.

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that moves the oil from the rear location to a storage area which does not affect the ballast of the platform.

The apparatus of the present invention includes a platform having a left side wall, a right side wall, a rear wall, a front opening, a floor, and a bottom, one or more ballasts which adjust the platform floor relative to a level of oil on the water surface, a rear location near the rear wall to collect the oil from the platform floor, and a pump connected to the rear location that moves the oil from the rear location to a storage area which does not affect the ballast of the platform, wherein the oil flows from the front opening across the floor to the rear wall when the front opening is below the surface of the oil.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that removes the oil from the rear location to a storage area.

Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that moves the oil from the rear location to a storage area.

Preferably, the platform floor is about at the interface of the oil and the water. Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

A preferred embodiment of the apparatus of the present invention is shown in FIGS. 1-8.

Figure 1:
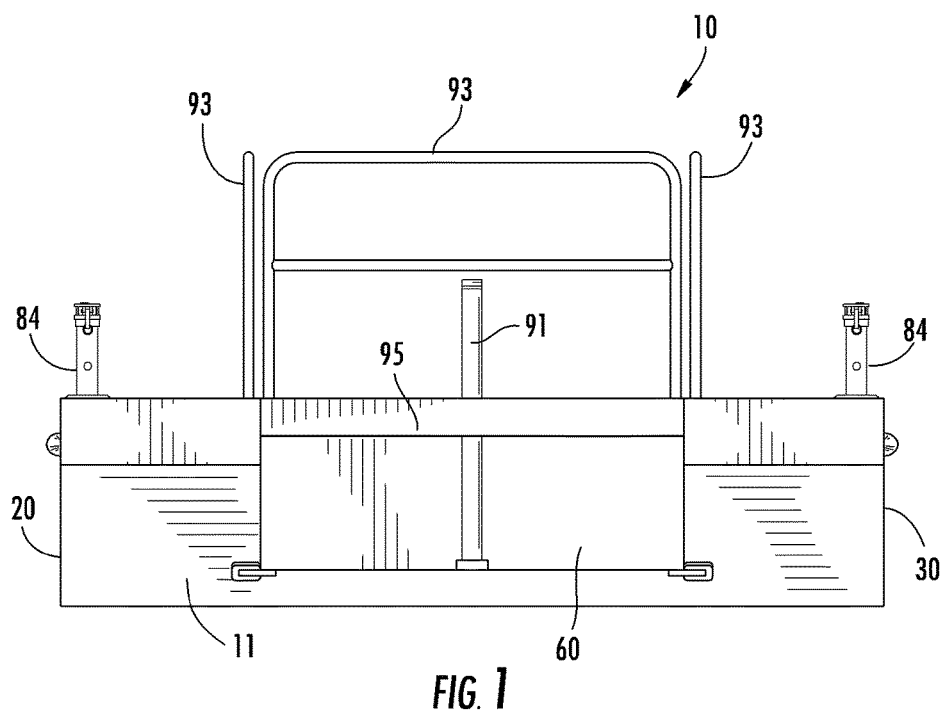
FIG. 1 is a front view of a preferred embodiment of the apparatus of the present invention.
Figure 2:
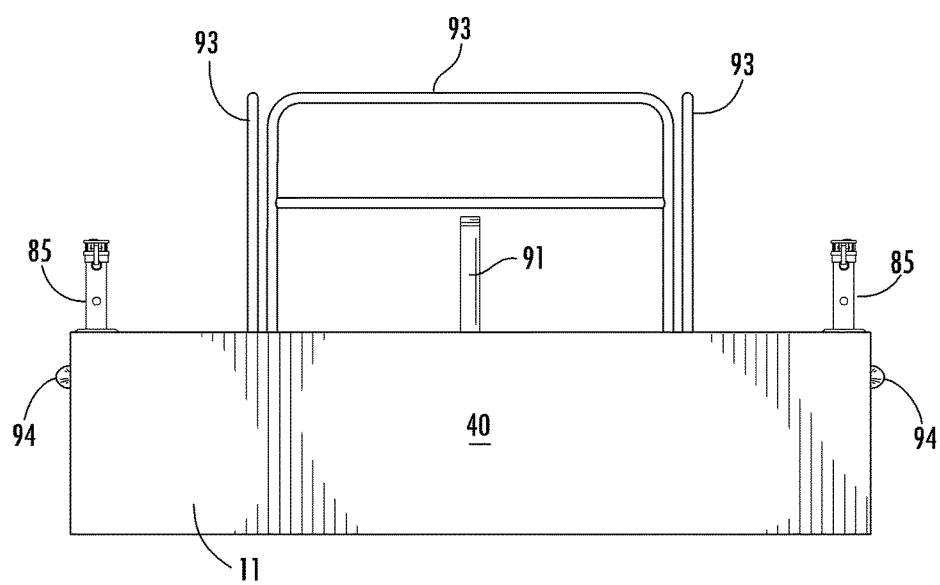
FIG. 2 is a rear view of a preferred embodiment of the apparatus of the present invention.
Figure 3:
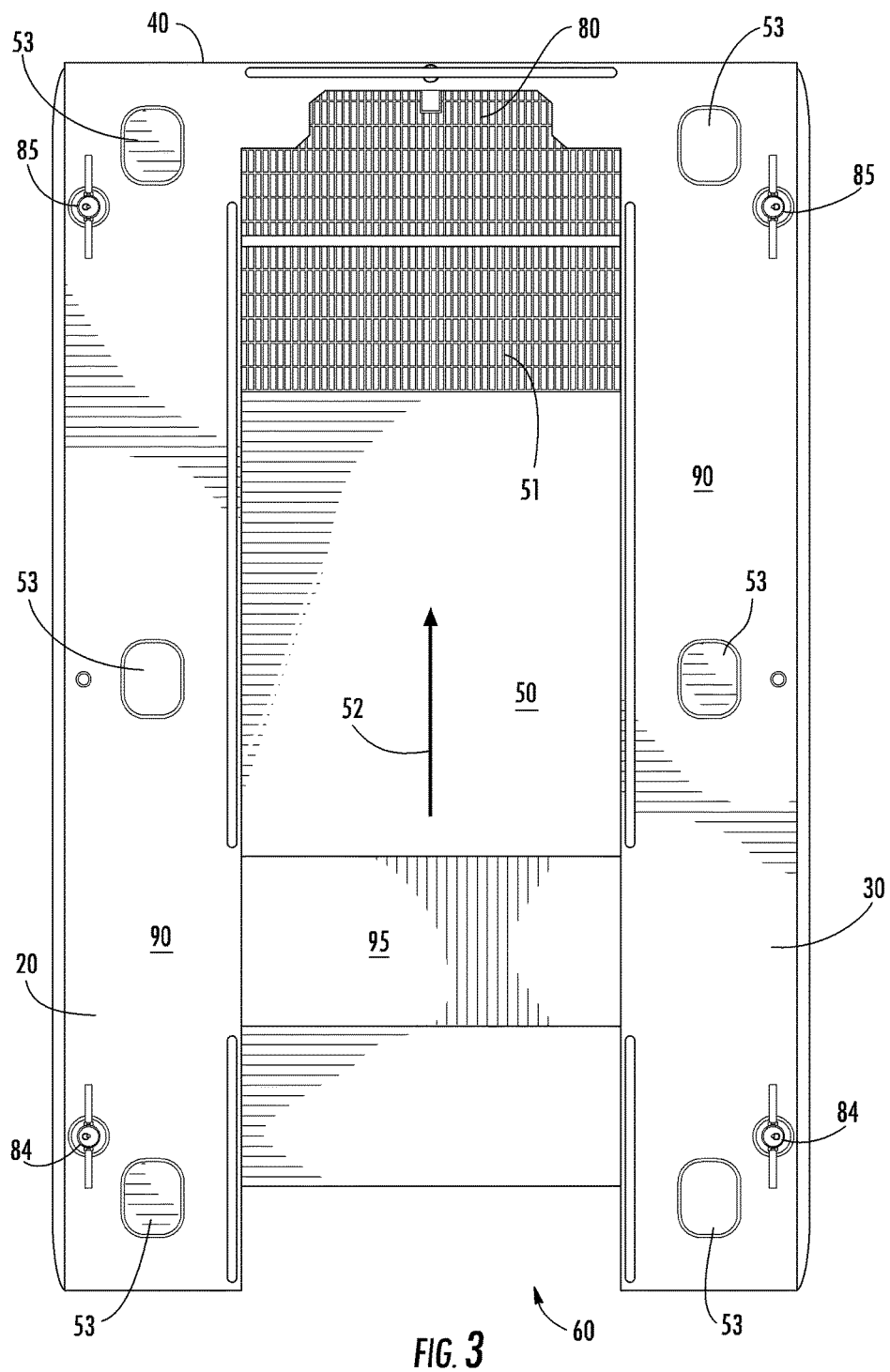
FIG. 3 is a top view of a preferred embodiment of the apparatus of the present invention.
Figure 4:
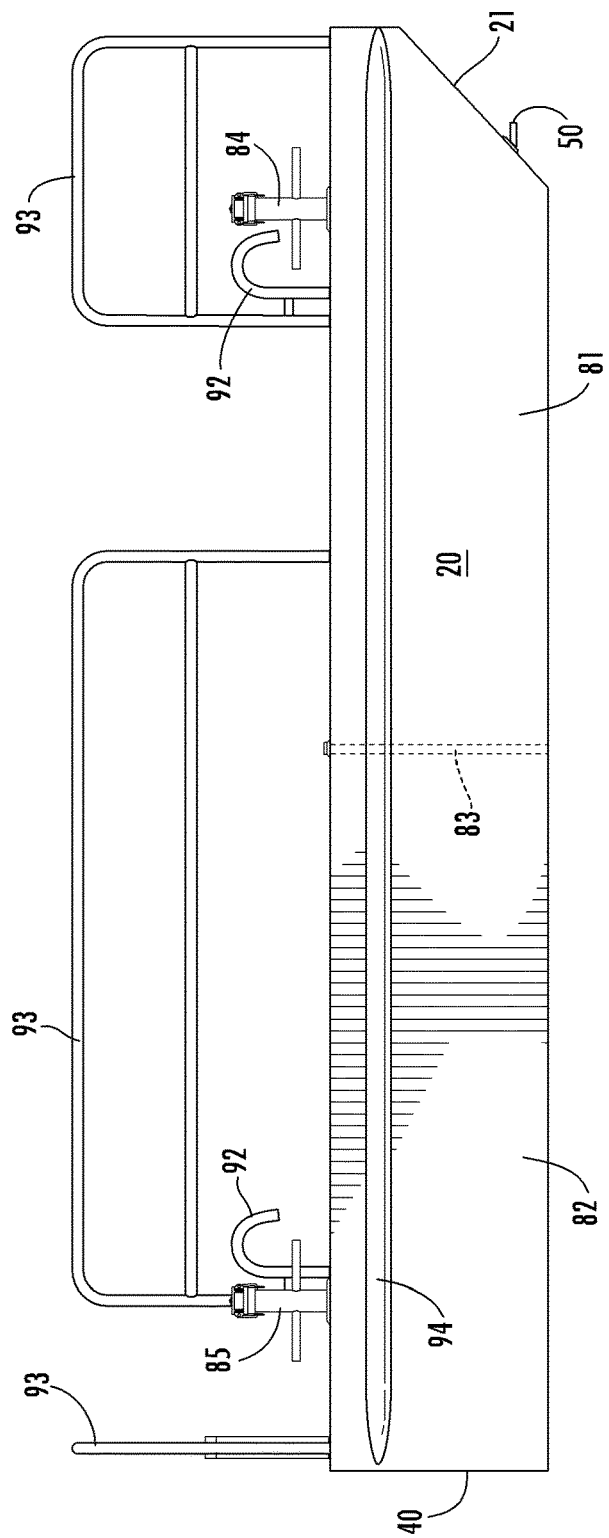
FIG. 4 is a right side view of a preferred embodiment of the apparatus of the present invention.
Figure 5:
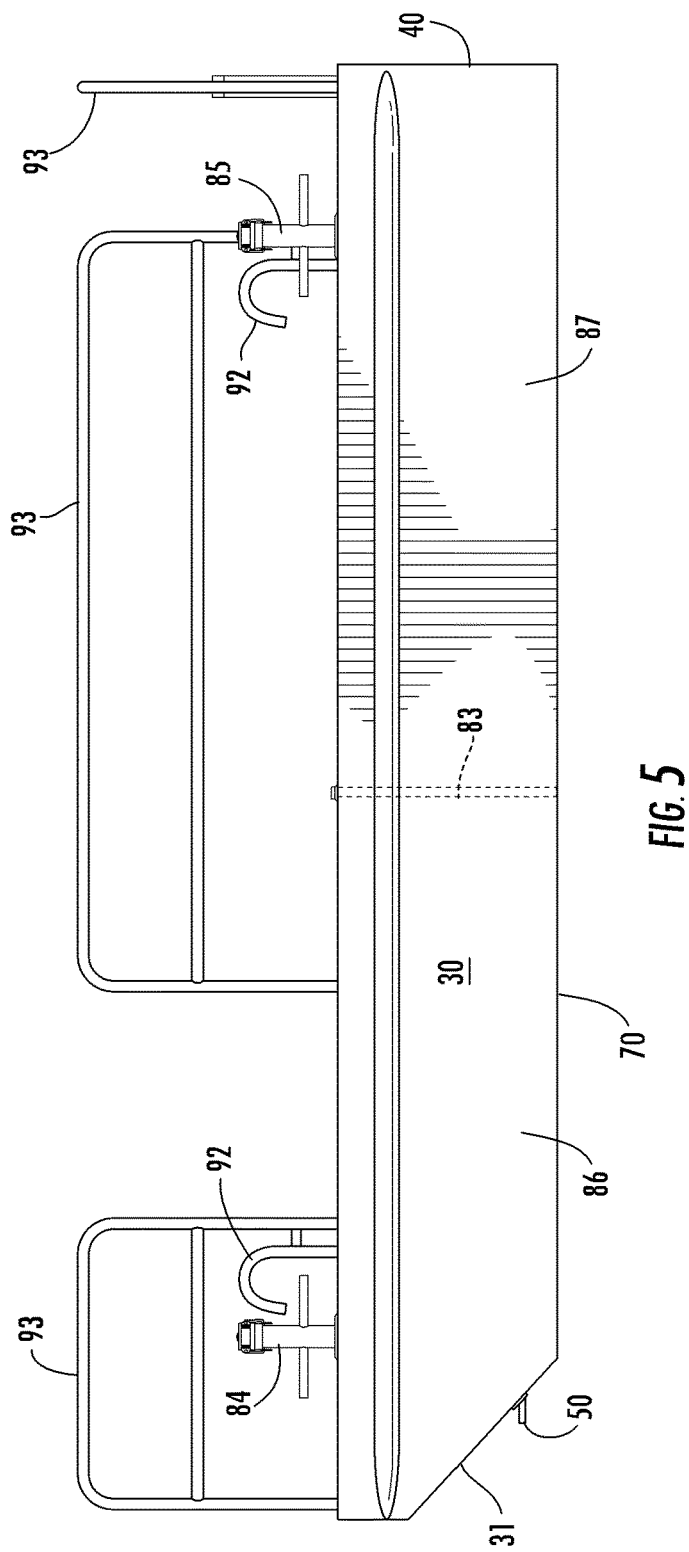
FIG. 5 is a left side view of a preferred embodiment of the apparatus of the present invention.
Figure 6:
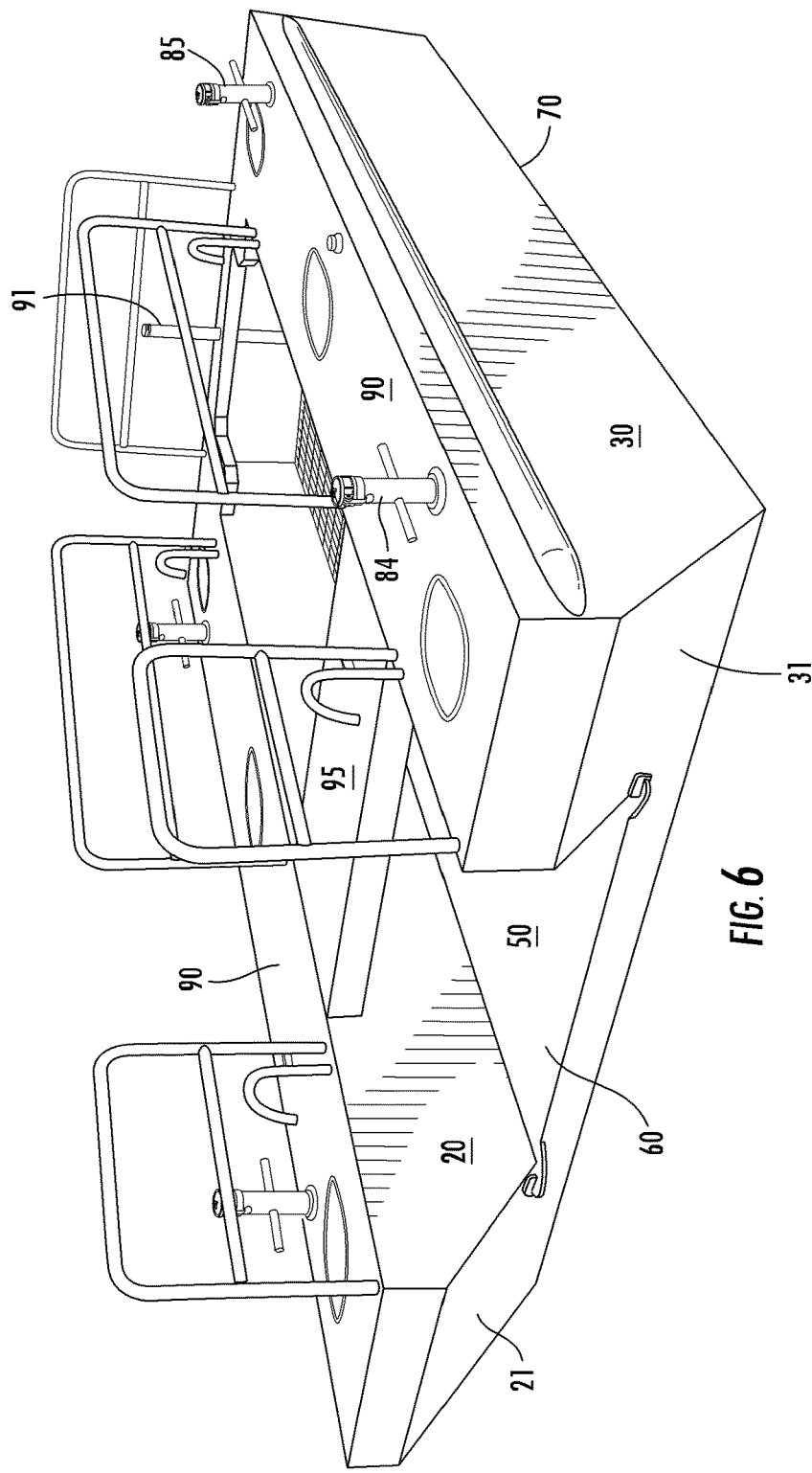
FIG. 6 is a perspective view of a preferred embodiment of the apparatus of the present invention.
Figure 7:
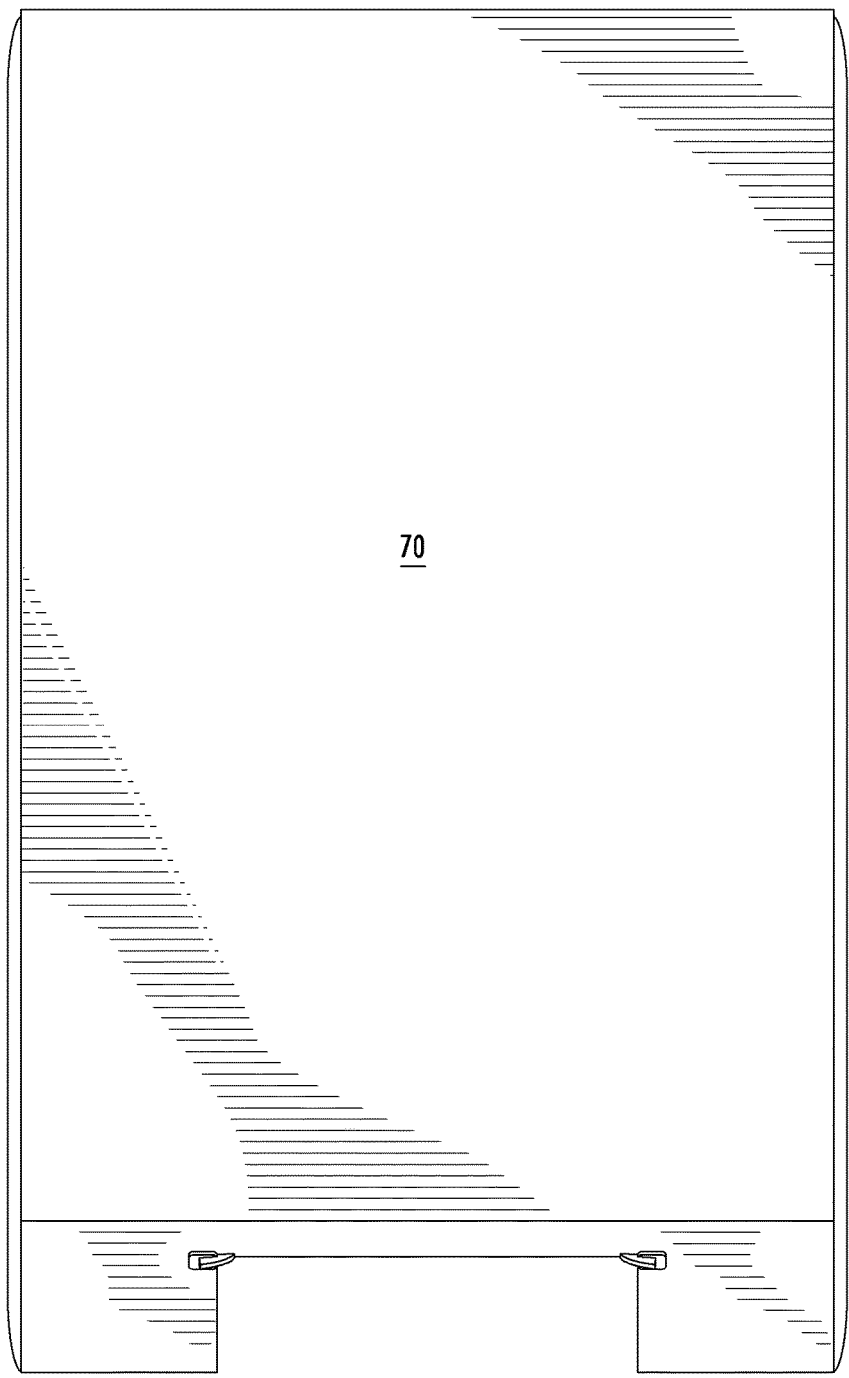
FIG. 7 is a bottom view of a preferred embodiment of the apparatus of the present invention.
Figure 8:
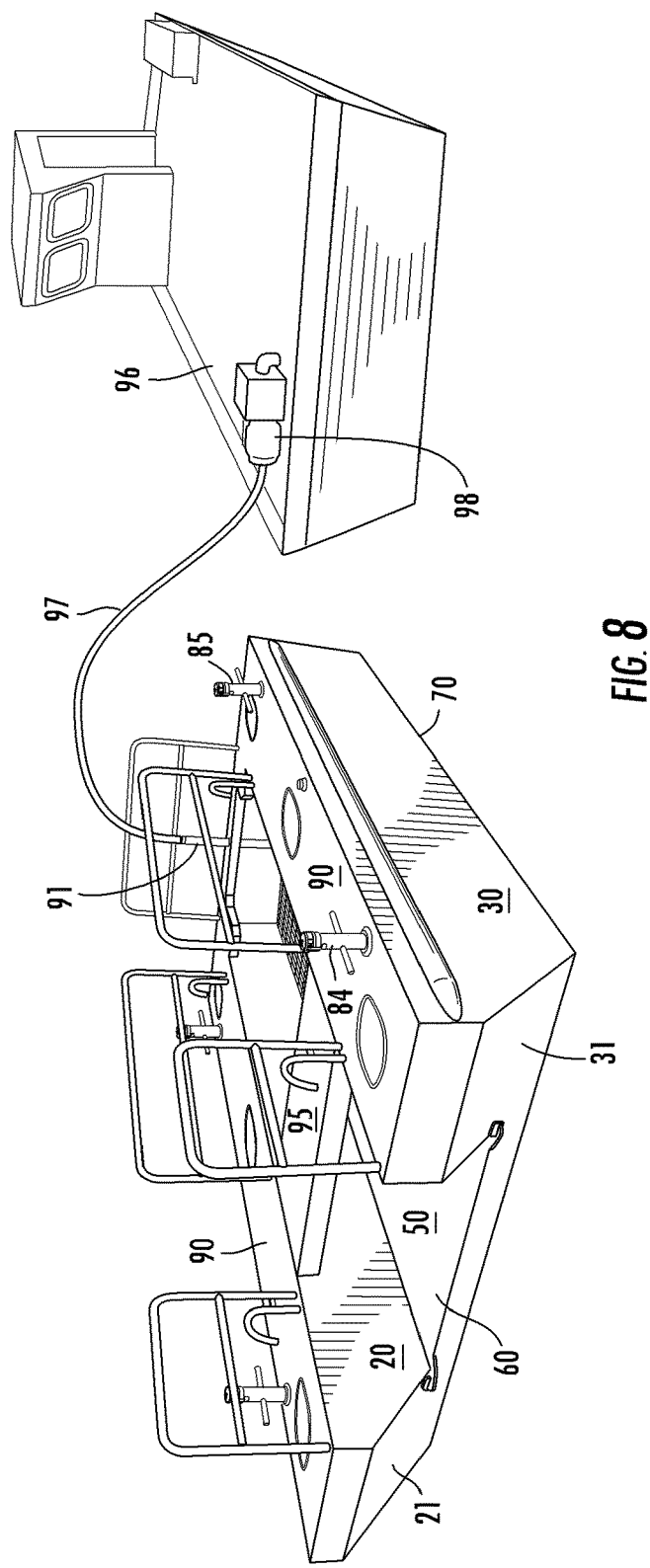
FIG. 8 is a perspective view of a preferred embodiment of the apparatus of the present invention.

The skimmer 10 of the present invention is a barge-style device for collecting oil or other pollutants from a water surface. The skimmer 10 can float right below the surface of the water. The skimmer can operate as a free standing vessel and does not need to be mounted to another vessel for operation. The skimmer of the present invention includes a right side wall/pontoon 20, a left side wall/pontoon 30, a rear wall 40, a floor 50 and a front opening 60. As seen in FIG. 3, each pontoon 20, 30 has an inner surface that extends over a majority of the length of skimmer body 11. The floor of the skimmer is unobstructed. Floor 50 near opening 60 can be the same height as the part of floor 50 near the rear wall 40. The skimmer 10 has a bottom 70 as seen in FIG. 4-6. The bottom 70 can be flat. Side walls/pontoons 20, 30 are angled at the ends 21, 31 closest to the front opening 60. The floor 50 extends from the front opening 60 to the rear wall 40. Side walls/pontoons can have bumpers 94 on the outside portion of the each wall 20, 30. The body of the skimmer 10 can be one piece, without any moveable parts.

As shown in FIGS. 3 and 6, side walls 20 and 30 are generally parallel.

The top of side walls/pontoons 20, 30 can have surface 90, on which a user can stand or sit and monitor the use of the skimmer 10. Railings 93 are attached onto surface 90 and can surround the skimmer floor. Railings 93 assist a user to move about the skimmer vessel during monitoring its use. Bridge 95 can be connected to surface 90 above and across the skimmer floor so that it does not interfere with the flow of oil into the skimmer. Access panels 53 can be located on surface 90 so that a user can access the interior of the skimmer and ballast tanks if necessary.

The skimmer has ballasts tanks 81, 82, 86, 87 that can be contained in body 11 of skimmer. The ballast tanks 81, 82, 86, 87 can sit on either side 20, 30 of the skimmer vessel so that the front opening 60 of the skimmer vessel can be adjusted to sit below the water surface at the level of the oil. Ballast tanks 81, 86 can be included in the front of pontoons 20, 30. Ballast tanks 82, 87 can be included in the rear of pontoon 20, 30. A wall 83 separates the front ballast tank 81, 86 from the rear ballast tank 82, 87. The wall 83 is preferably located in the middle of each pontoon. Optionally, the wall 83 can be located at any location in the pontoon 20, 30.

Inlets 84, 85 can be located on surface 90 of the skimmer apparatus. Front inlets 84 allow water to be added to the front ballast tanks 81, 86. Rear inlets 85 allow water to be added to the rear ballast tanks 82, 87. Vents 92 can be located on surface 90 and at the front and rear of each pontoon 20, 30. Vents 92 allow air to escape from the top of the ballast tank and be replaced by water entering through the ballast tank inlets 84, 85. The ballast tanks adjust the depth of the skimmer floor 50 into the oil and water so that the floor 50 sits at the interface of the oil and water. The platform floor is about one (1) to three (3) inches below the oil on the water surface, or variable to consistency of oil or pollutant floating on water surface. A storage vessel or barge 96 is connected to the skimmer 10 and holds all of the oil collected by the skimmer. During use, a user does not need to continually adjust the ballasts as the skimmer elevation does not change since the storage vessel/barge increases in weight due to the oil it picks up. The tanks are preferably ballasted so that the rear of the skimmer is preferably a little lower in elevation than the front of the skimmer.

The skimmer vessel can work stationary in the water, and does not require a propeller or pulling means for operation, as the oil will continue to flow into the skimmer as the oil is pumped out of the rear by the gravity flow to the rear of the vessel. The storage vessel or barge 96 can also be stationary with the skimmer vessel 10 while the barge pumps the oil from the skimmer vessel to the barge 96. The skimmer 10 can be self-propelled through a body of water with oil or other pollutants by the use of a propulsion device, preferably propellers, attached to the body 11 of the skimmer 10. Optionally, an outboard or hydraulic propeller can be attached to the skimmer. The skimmer can also be pushed with a small boat to direct it through the water.

When the skimmer floor 50 is at a desired level in the oil and water, oil flows into the front opening 60 onto the skimmer floor 50. The oil then moves across the floor 50 toward the rear wall 40, where the oil enters a rear location 80. The oil passes over grating 51 which can be located near rear wall 40. Grating 51 assists with preventing large debris from entering the rear location 80. The direction of the oil flow is indicated by arrow 52 in FIG. 3. The rear location 80 is preferably a box or tank. The box or tank 80 is a collection area that can sit at a lower elevation than the skimmer floor 50 intake so that the oil flows from the floor 50 into the rear location 80. Once the oil enters the rear location 80, it moves from the rear location 80 to a storage area/barge 96 via a suction pipe 91, hose 97 and hydraulic pump 98. The suction pipe 91 can be adjustable. The suction pipe 91 attaches from the rear location/tank 80 and discharges the collected oil through a hose 97 to a storage area 96, such as a barge or second vessel that can be situated close to the skimmer vessel, such as for example behind the skimmer (see FIG. 8). The hydraulic pump 98 is connected to the hose 97 on the storage vessel 96. Optionally, the hydraulic pump can be connected to the hose on the skimmer apparatus 10.

As can be seen for example in FIG. 3 and as described in the paragraph above, rear location 80 acts as a drain opening which extends across a majority of the width of floor 50 at rear location 80. The text above describes and FIG. 3 shows that rear location 80 acts as an expansive intake opening which extends across a majority of the width of floor 50. The text above also describes, and is supported by FIG. 3, for example, that rear location 80 acts as a drain which extends at least half the distance from the inner left side wall 30 (commonly referred to as the port side) to the inner right side wall 20 (commonly referred to as the starboard side).

The text above and FIG. 3 disclose that there is a grating 51 which can be located near rear wall 40 within rear location 80 and that the grating 51 assists in preventing large debris from entering rear location 80, but that oil enters rear location 80 after passing over the grating 51. The grating 51 thereby acts as a drain, allowing oil to enter rear location 80 but preventing large debris from entering into it. FIG. 3 shows that grating 51 (i.e. drain opening) extends across a majority of the width of floor 50 at rear location 80.

As described above, rear location 80 is preferably a box or tank that is a collection area that can sit at a lower elevation than the skimmer floor 50 intake so that the oil flows from the floor 50 into rear location 80. The fact that oil can enter rear location 80 and collect there means that rear location 80 has an opening of some kind that allows the oil to enter it and collect there. Rear location 80 thereby acts as an oil intake opening. FIG. 3 shows that rear location 80 extends across a majority of the width of floor 50.

As described above, rear location 80 acts as an oil intake. As described above and FIG. 3 disclose that there is a grating 51 that acts as a drain by allowing the oil to enter rear location 80. FIG. 3 shows the grating 51 extending at least half the distance from the inner left side wall 30 to the inner right side wall 20. The left side of a boat is commonly referred to as the port side, and the right side of the boat is commonly referred to as the starboard side.

The storage vessel or barge 96 can be 12 feet wide×4 feet high×20 feet long with a capacity of 7,000 gallons to 30 feet wide×8 feet high×120 feet long with a capacity of 168,300 gallons. Ranges of dimensions for the skimmer 10 can be 12-30 feet wide by 20-120 feet long by 4-8 feet high; for example, skimmer 10 can be 12 feet wide by 4 feet high, by 20 feet long, or any multiple size thereof. The storage vessel or barge has a capacity of 7,000-168,300 gallons, for example 7,000 gallons, or any multiple size thereof of oil or other pollutant.

Experimental results have shown about 95% oil pick up.

The skimmer 10 can be made of aluminum or steel. Exemplary dimensions of the skimmer 10 can be 12-36 feet wide by 20-60 feet long by 3-7 feet high, for example 12 feet wide by 20 feet long by 3 feet high or any multiple size thereof. Skimmer 10 can be sized up or down as desired or appropriate for a particular job.

While preferably the skimmer is self propelled, it can also be stationary and oil can feed into the box 80 via gravity alone when the front opening 60 is positioned at the oil water interface.

The present invention includes an apparatus 10 for removing oil or other pollutants from a water surface, comprising:

a buoyant platform having an overall length, a bow end, a stern end (see, for example, FIGS. 3 and 6), a pair of spaced apart pontoons including a left pontoon having a left inner side wall 30, a right side pontoon having a right inner side wall 20, a rear wall 40, a front opening 60, a platform floor 50 that connects to said left 30 and right inner side walls 20 and having a floor width, a floor level and a floor periphery, the left inner side wall 30, right inner side wall 20 and rear wall 40 being located at said floor periphery, wherein the left inner side wall 30 and right inner side wall 20 are generally parallel and each inner side wall extending said overall length;

the pontoons 20, 30 having a front end portion at the bow end and a rear end portion at the stern end and one or more ballast tanks 81, 82, 86, 87 which adjust the platform floor 50 relative to a level of oil or other pollutants on the water surface;

wherein the platform floor has a forward edge (see, for example FIG. 4) at said bow end, a rear edge, the elevation of the front and rear edges being adjustable with the ballast tanks to define an oil intake elevation so that the oil or other pollutants flows in an unobstructed flow stream from the front opening at said forward edge 21, 31 across and above the floor 50 and in between the left inner 30 and right inner 20 side walls and to the rear edge 40;

wherein said flow stream extends from the left inner side wall 30 to the right inner side wall 20;

a rear location near the rear wall 40 to collect the oil or other pollutants from the platform floor 50, said rear location including a drain opening 51 (see, for example, FIG. 3) that extends across a majority of the floor 50 width at said rear location; and a pump 98 connected to the rear 40 location that removes the oil or other pollutants from the rear location which does not affect the one or more ballasts 81, 82, 86, 87 of the platform.

PARTS LIST

The following is a list of suitable parts and materials for the various elements of the preferred embodiment of the present invention.

| Parts Number | Description |
| --- | --- |
| 10 | skimmer |
| 11 | skimmer body |
| 20 | right side wall |
| 21 | end |
| 30 | left side wall |
| 31 | end |
| 40 | rear wall |
| 50 | floor |
| 51 | grating |
| 52 | arrow |
| 53 | access panel |
| 60 | front opening |
| 70 | bottom |
| 80 | rear location |
| 81 | front ballast tank |
| 82 | rear ballast tank |
| 83 | wall |
| 84 | front ballast inlet |
| 85 | rear ballast inlet |
| 86 | front ballast tank |
| 87 | rear ballast tank |
| 90 | surface |
| 91 | suction pipe |
| 92 | vent |
| 93 | railing |
| 94 | bumper |
| 95 | bridge |
| 96 | barge |
| 97 | hose |
| 98 | pump |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for removing oil or other pollutants from a water surface, comprising:
   a) a buoyant platform having an overall length, a bow end, a stern end, a pair of spaced apart pontoons including a left pontoon having a left inner side wall, a left outer side wall, a left pontoon stern end, a right side pontoon having a right inner side wall, a right outer side wall, a right pontoon stern end, a rear wall, a front opening, a platform floor that connects to said left and right inner side walls and having a floor width, a floor level and a floor periphery, the left inner side wall, right inner side wall and rear wall being located at said floor periphery, wherein the left inner side wall and right inner side wall are generally parallel and each inner side wall extending over a majority of said overall length;
   b) wherein the left pontoon provides said left outer side wall and the right pontoon provides the right outer side wall, wherein said platform has a periphery that includes said outer side walls of said pontoons;
   c) the pontoons having a front end portion at the bow end and a rear end portion at the stern end and one or more ballast tanks which adjust the platform floor relative to a level of oil or other pollutants on the water surface;
   d) wherein the platform floor has a forward edge at said bow end, a rear edge, the elevation of the front and rear edges being adjustable with the one or more ballast tanks to define an oil intake elevation so that the oil or other pollutants flows in an unobstructed flow stream from the front opening at said forward edge across and above the floor and in between the left and right inner side walls and to the rear edge;
   e) wherein said flow stream extends from the left inner side wall to the right inner side wall and from said front opening to said stern end;
   f) a rear location near the rear wall to collect the oil or other pollutants from the platform floor, said rear location including a drain opening in said platform floor that extends across a majority of the floor width at said rear location;
   g) a pump connected to the rear location that removes the oil or other pollutants from the rear location which does not affect the one or more ballasts of the platform; and
   h) wherein the rear location extends forward of the pontoon stern ends.

2. The apparatus of claim 1, wherein the platform floor floats below the level of the oil or other pollutants.

3. The apparatus of claim 1, wherein the rear location sits at a lower elevation than the floor.

4. The apparatus of claim 1, wherein the floor level of the platform floor can be changed depending upon changes in the consistency of the oil or other pollutants on the water surface.

5. The apparatus of claim 1, wherein the platform is self-propelled.

6. The apparatus of claim 1, further comprising a second vessel in fluid communication with said pump in which the oil or other pollutants is contained upon receipt from said pump.

7. An apparatus for removing oil or other pollutants from a water surface, comprising:
   a) a buoyant, movable platform having an overall length, an outer platform periphery that includes port and starboard outer sides, a bow end, a stern end, a left inner side wall, a right inner side wall, a rear wall, a front opening, a floor that is connected to each of said left inner and right inner side walls and having a floor width that is about equal to a distance between said inner side walls, a floor level, and a floor bottom, wherein the left inner side wall and right inner side wall are generally parallel and each inner side wall extending a majority of said overall length;
   b) wherein a left pontoon provides said port outer side and a right pontoon provides the starboard outer side, each said left and right pontoon having a pontoon stern end;
   c) one or more ballast tanks which adjust the platform floor level relative to a level of oil or other pollutants on the water surface so that oil or other pollutants flows to the floor via the front opening responsive to a forward movement of the platform;
   d) wherein the platform floor has a forward edge at said bow end, a rear edge, the elevation of the front and rear edges being adjustable with the one or more ballast tanks to define an oil intake elevation so that the oil or other pollutants flows in an unobstructed flow stream from the front opening at said forward edge across and above the floor and in between the left and right inner side walls and to the rear edge;
   e) wherein said unobstructed flow stream extends from the said left inner side wall to the said right inner side wall and from said front opening to said stern end;
   f) a rear location near the rear wall to collect the oil or other pollutants from the platform floor, said rear location including a drain that extends across a majority of said floor width;
   g) a pump connected to the rear location and the drain that moves the oil or other pollutants from the rear location to a storage area which does not affect the one or more ballasts of the platform, wherein the oil or other pollutants flows from the front opening across the floor to the rear wall when the front opening is below the level of the oil or other pollutants; and h) wherein the rear location extends forward of the left and right pontoon stern ends.

8. The apparatus of claim 7, wherein the platform floor floats below the level of the oil or other pollutants.

9. The apparatus of claim 7, wherein the floor level of the platform floor can be changed depending upon changes in the consistency of the oil or other pollutants on the water surface.

10. The apparatus of claim 7, further comprising one or more propellers attached to the platform.

11. The apparatus of claim 7, further comprising a second vessel in which the oil or other pollutants is contained.

12. The apparatus of claim 7, wherein the apparatus is moved by a hydraulic propeller, an outboard or a small boat.

13. A method of removing oil or other pollutants from a water surface, comprising:
  a) providing a movable, buoyant platform having bow and stern ends, port and starboard outer sides, spaced apart port and starboard pontoons, wherein the port pontoon has a port inside wall and the starboard pontoon has a starboard inside wall;
  b) wherein the port pontoon provides said port outer side and the starboard pontoon provides the starboard outer side;
  c) a platform having a rear wall, a front opening, a floor having a floor width and a floor level, wherein the inside walls are generally parallel;
  d) the pontoons providing one or more ballasts which adjust the platform floor relative to a level of oil or other pollutants that are floating on the water surface;
  e) removing oil or other pollutants from the water surface by collecting oil or other pollutants from the water surface via the front opening by moving the platform relative to said water surface wherein all oil or other pollutants flows in a flow stream from the front opening toward the rear wall, wherein said flow stream extends from said port inside wall to said starboard inside wall and above the said floor and from said front opening to said stern end;
  f) providing a rear location to collect the oil or other pollutants from the platform floor, wherein said rear location includes an expansive intake opening in said floor that extends across a majority of said floor width;
  g) providing a pump connected to the rear location;
  h) moving the oil or other pollutants from the rear location to a storage area which does not affect the ballast of the platform, wherein the oil or other pollutants flows from the front opening across the floor in an unobstructed flow stream to the rear wall;
  i) wherein the flow stream of step "h" extends from the port inside wall to said starboard inside wall; and
  j) wherein the rear location extends forward of the stern end.

14. The method of claim 13, wherein in step "c" the platform floor is about at the interface of the oil or other pollutants and the water.

15. The method of claim 13, wherein in step "c" the platform floor floats below a surface of the oil or other pollutants.

16. The method of claim 13, including means for allowing the floor level of the platform floor to be changed depending upon changes in the consistency of the oil or other pollutants on the water surface.

17. The method of claim 13, further comprising one or more propellers attached to the platform and propelling the platform with the propellers.

18. The method of claim 13, further comprising providing a second vessel in which the storage area is located.

19. The method of claim 13, wherein the platform is moved by a hydraulic propeller, an outboard or a small boat.

20. An apparatus for removing oil from a water surface, comprising:
  a) a buoyant, movable vessel having an outer periphery that includes port and starboard outer sides, a stern having a stern wall, a port side pontoon having a port inner side wall and a port pontoon stern end, a starboard side pontoon having a starboard inner side wall and a starboard pontoon stern end, a bow with an opening that extends from the port inner side wall to the starboard inner side wall, and a floor connecting to each of said pontoons, said floor extending in between said port and starboard inner side walls, said floor having a floor area, wherein the inner side walls are generally parallel;
  b) wherein the port side pontoon provides said port outer side and the starboard side pontoon provides the starboard outer side;
  c) the vessel having one or more ballasts in the pontoons which enable adjustment of the elevation of the floor relative to a level of oil on the water surface so that oil flows in a flow stream over a majority of the floor area via the bow opening responsive to a forward movement of the vessel;
  d) the floor having an oil collection intake positioned at the stern wall, said intake including a drain that extends at least half the distance from the port inner side wall to the starboard inner side wall, said oil collection intake extending in front of the pontoon stern ends; and
  e) a propulsion that moves the vessel forward, wherein forward movement toward the oil or other pollutants generates a flow stream that extends from the front opening to said stern across and above the floor and wherein said flow stream extends completely from the port inner side wall to the starboard inner side wall.

\* \* \* \* \*